(12) United States Patent
Pieper

(10) Patent No.: US 8,069,182 B2
(45) Date of Patent: Nov. 29, 2011

(54) RELEVANCY-BASED DOMAIN CLASSIFICATION

(75) Inventor: Keith Merle Pieper, Davis, CA (US)

(73) Assignee: Working Research, Inc., San Francisco, CA (US)

( * ) Notice: Subject to any disclaimer, the term of this patent is extended or adjusted under 35 U.S.C. 154(b) by 268 days.

(21) Appl. No.: 11/739,611

(22) Filed: Apr. 24, 2007

(65) Prior Publication Data

US 2007/0250468 A1    Oct. 25, 2007

Related U.S. Application Data

(60) Provisional application No. 60/794,754, filed on Apr. 24, 2006.

(51) Int. Cl.
*G06F 17/30* (2006.01)
*G06F 9/44* (2006.01)
(52) U.S. Cl. ........................................ 707/769; 717/173
(58) Field of Classification Search ........................ None
See application file for complete search history.

(56) References Cited

U.S. PATENT DOCUMENTS

| | | | |
|---|---|---|---|
| 5,642,518 A | 6/1997 | Kiyama et al. | |
| 5,948,061 A | 9/1999 | Merriman et al. | |
| 6,134,532 A | 10/2000 | Lazarus et al. | |
| 6,308,202 B1 | 10/2001 | Cohn et al. | |
| 6,311,194 B1 * | 10/2001 | Sheth et al. | 715/236 |
| 6,327,574 B1 | 12/2001 | Kramer et al. | |
| 6,366,298 B1 | 4/2002 | Haitsuka et al. | |
| 6,385,592 B1 | 5/2002 | Angles et al. | |
| 6,453,315 B1 | 9/2002 | Weissman et al. | |
| 6,484,146 B2 | 11/2002 | Day et al. | |
| 6,681,223 B1 | 1/2004 | Sundaresan | |
| 6,816,857 B1 | 11/2004 | Weissman et al. | |
| 6,880,123 B1 | 4/2005 | Landsman et al. | |
| 6,973,505 B1 * | 12/2005 | Schneider | 709/245 |
| 7,010,497 B1 | 3/2006 | Nyhan et al. | |

(Continued)

FOREIGN PATENT DOCUMENTS

WO    2006/008516 A1    1/2006

OTHER PUBLICATIONS

OpenX, Delivery Limitations; http://www.openx.org/docs/2.4/userguide/banner-delivery-limitations; 1 page; retrieved Jul. 23, 1999.

(Continued)

*Primary Examiner* — Tarek Chbouki
(74) *Attorney, Agent, or Firm* — HolzerIPLaw, PC

(57) ABSTRACT

A domain classifier develops and maintains relevance data about specific domains based on historical relevance data and source context data. Such data may be used to classify the user's interest in attempting to visit a specific domain and thereby redirect the user to a website expected to be aligned with the user's interest. In various implementations, the historical relevance data is derived from source context data and/or post-visit user behavior collected from previous attempts to visit a specific domain. The source context data collected from the current visit may also be used as source context-factors to influence domain classification. Based on such historical and current source context factors, as well as the domain address provided in the user's navigation request, a domain classifier consults the historical relevance data and provides the user with Web content that is identified as likely to be relevant to the user's interests.

48 Claims, 6 Drawing Sheets

U.S. PATENT DOCUMENTS

| | | | |
|---|---|---|---|
| 2001/0054020 A1 | 12/2001 | Barth et al. | |
| 2001/0056405 A1 | 12/2001 | Muyres et al. | |
| 2002/0046102 A1* | 4/2002 | Dohring et al. | 705/14 |
| 2002/0123912 A1 | 9/2002 | Subramanian et al. | |
| 2002/0161745 A1 | 10/2002 | Call | |
| 2003/0023489 A1 | 1/2003 | McGuire et al. | |
| 2003/0126119 A1* | 7/2003 | Lin | 707/3 |
| 2003/0187817 A1* | 10/2003 | Agrawal et al. | 707/1 |
| 2004/0093327 A1 | 5/2004 | Anderson et al. | |
| 2004/0249709 A1 | 12/2004 | Donovan et al. | |
| 2004/0260744 A1* | 12/2004 | Goulden et al. | 709/200 |
| 2005/0010567 A1 | 1/2005 | Barth et al. | |
| 2005/0038894 A1* | 2/2005 | Hsu et al. | 709/228 |
| 2005/0198494 A1* | 9/2005 | Ishibashi | 713/155 |
| 2005/0278317 A1 | 12/2005 | Gross et al. | |
| 2006/0004732 A1 | 1/2006 | Odom | |
| 2006/0026147 A1* | 2/2006 | Cone et al. | 707/3 |
| 2006/0064411 A1 | 3/2006 | Gross et al. | |
| 2006/0069784 A2 | 3/2006 | Hsu et al. | |
| 2007/0011020 A1* | 1/2007 | Martin | 705/1 |
| 2007/0038516 A1* | 2/2007 | Apple et al. | 705/14 |
| 2007/0050413 A1* | 3/2007 | Kominek et al. | 707/104.1 |
| 2007/0140214 A1* | 6/2007 | Zoltan | 370/352 |
| 2007/0219754 A1* | 9/2007 | D'Ambrosio | 702/188 |
| 2007/0244748 A1* | 10/2007 | Smith et al. | 705/14 |
| 2008/0027812 A1* | 1/2008 | Hsu et al. | 705/14 |

OTHER PUBLICATIONS

Barefruit—The Barefruit Solution; http://barefruit.co.uk; 1 page; retrieved Jul. 23, 1999.

PR Newswire, "New Way to Buy Targeted Web Traffic," Mar. 24, 2003, London, UK, 1 page, retrieved from URL: <http://goliath.ecnext.com/coms2/gi_0199-2742732/New-way-to-buy-targeted.html>, PR Newswire, a U.S. Broadcast Media Company, New York, NY.

Choicestream, Technology Brief, "Review of Personalization Technologies: Collaborative Filtering vs. ChoiceStream's Attributized Bayesian Choice Modeling," Feb. 2004, 13 pages, ChoiceStream, Inc., Cambridge, Massachusetts.

Clearforest, "Approaches For Text Extraction," white paper, 2 pages, Copyright 2006, ClearForest Corp., Waltham, Massachusetts.

Traffic Avenue, "Domain Name Industrial Averages," patent pending method enabling website owners and domain name owners to enter into traffic rental contracts based on categories and flat monthly rates, retrieved Sep. 25, 2007 from URL:<http://web.archive.org/web/20010330073233/http://www.trafficavenue.com/, 3 pages.

Touch Clarity, "The Rise of On-site Behavioral Targeting," Touch Clarity, Inc., Boston, Massachusetts, 2007.

OpenX, Delivery Limitations, retrieved Jul. 23, 2009 from http://www.op;enx.org/docs/2.4/userguide/banner-delivery-limitations, 1 page.

Barefruit—The Barefruit Solution, retrieved Jul. 23, 2009 from http://barefrult.co.uk, 1 page.

* cited by examiner

RELEVANCY-BASED DOMAIN CLASSIFICATION

CROSS-REFERENCE TO RELATED APPLICATIONS

The present application claim benefit to U.S. Provisional Application No. 60/794,754, entitled "Relevancy Based Doman Name Redirecting" and filed on Apr. 24, 2006, which is hereby incorporated by reference for all that it discloses and teaches.

BACKGROUND

Directing Web users to relevant Web content can generate significant revenue for those content providers. For example, if a user is looking for information about purchasing an automobile, then an automobile dealership owning a website has an improved chance of making a sale or at least marketing to an apparently interested consumer if the user navigates or is directed to the dealership's website. As such, website owners are willing to pay for increasing traffic to their websites, especially when the increased traffic is concentrated with users particularly interested in the products and services their businesses offer.

To this end, website owners, and those who direct Web users to such websites, are challenged to distinguish which users are interested in which websites. In some existing approaches, banner ads may be associated with Web pages of similar subject matter (e.g., Ford may advertise on a Web page containing an article about automobile safety), banner ads may be served up based on cookie information on the user's system, and sponsored links may be shown on search engine results pages based on the search keywords entered by the user. Nevertheless, many other opportunities to capture relevant user interest are missed because it remains difficult to discern a user's navigation intentions from the information available during a browsing session.

SUMMARY

Implementations described and claimed herein address the foregoing problems by developing and maintaining historical relevance data about specific domains based on target context data and/or source context data. Such data may be used to classify the user's interest in attempting to visit a specific target domain and thereby redirect the user to a website expected to be aligned with the user's interest (or otherwise provide relevant new Web content). In various implementations, the historical relevance data is derived from target context data and/or from source context data and/or post-visit user behavior collected from previous attempts to visit a specific domain. The source and/or target context data collected from the current visit may also be used as context-factors to influence domain classification. Based on such historical context data, context factors from the current visit, and/or the domain address provided in the user's navigation request, a domain classifier consults the historical relevance data and provides the user with Web content that is identified as likely to be relevant to the user's interests (e.g., by redirecting the user to a designated Web site or providing designated Web content according to the user's anticipated interests). In an alternative implementation, the domain classifier generates one or more keywords representing a topic of interest and submits it to a system capable of serving relevant new Web content or identifying a relevant new content domain (e.g., serving up a new banner ad).

In some implementations, articles of manufacture are provided as computer program products. One implementation of a computer program product provides a tangible computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
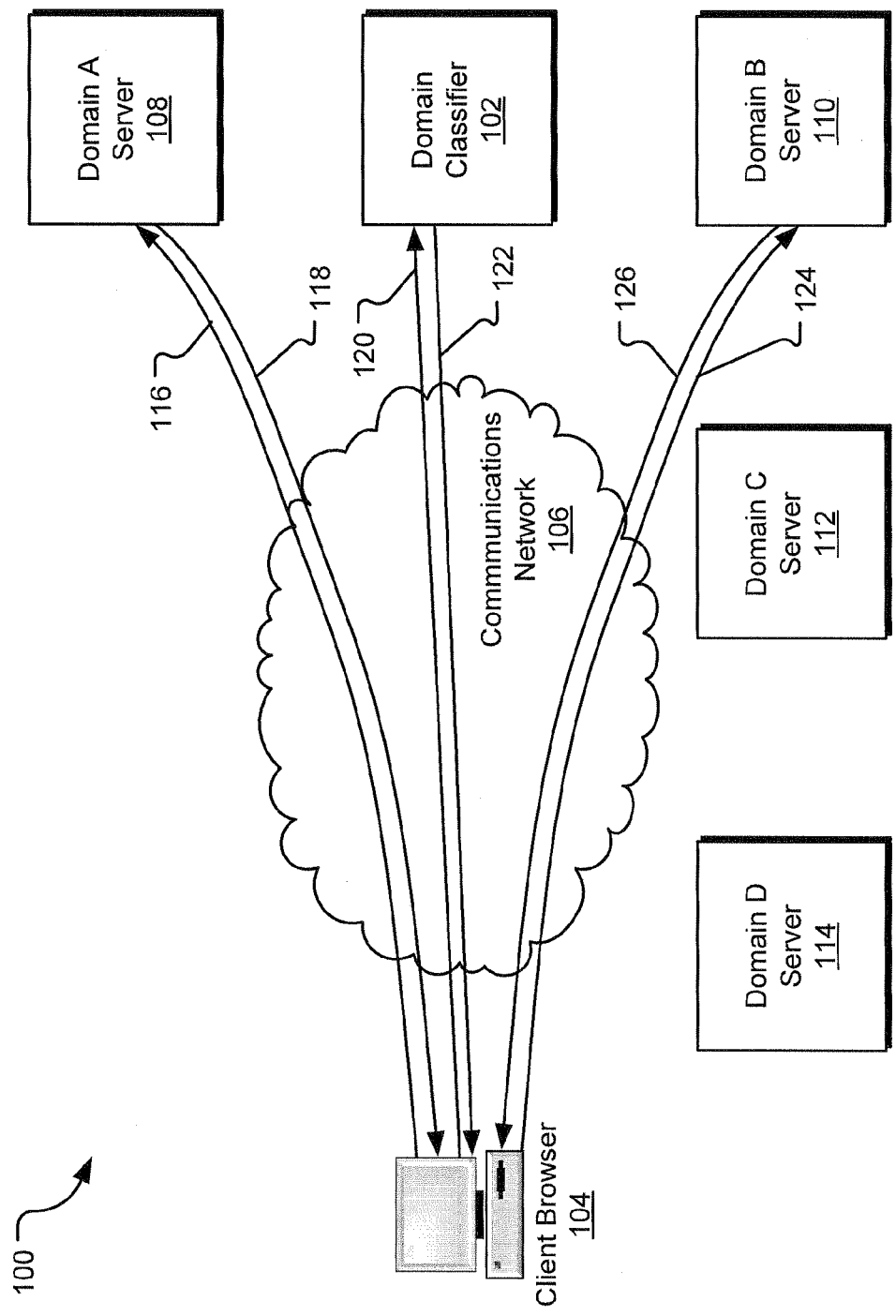
FIG. 1 illustrates a browsing configuration including an exemplary domain classifier.

FIG. 1 illustrates a browsing configuration 100 including an exemplary domain classifier 102. A user can use a browser 104 at a client system to connect across a communications network 106 (e.g., the Internet, an intranet, an extranet, a mobile communications network, some combination thereof, etc.) to access Web content available provided by Web servers. FIG. 1 illustrates various Web servers at various domains, including Domain A server 108, Domain B server 110, Domain C server 112, and Domain D server 114.

In one example, the user sends (e.g., POSTs) a request (through the client browser 104) to access content from the Domain A server 108. A user can initiate such a request in a variety of ways, including selecting a hypertext link in a Web page that is displayed in the client browser 104, selecting a hypertext link on a search results Web page, entering the address (e.g., domain address) of the Domain A server into an address field of an address bar in a browser, etc.

The request takes the form of a HyperText Transfer Protocol (HTTP) request 116 directed to a Uniform Resource Identifier (URI), a Uniform Resource Locator (URL) address, or other form of domain address. An example domain address for Domain A may be a domain name such as www.postage.com, although an IP address may also be used as a domain address. In this example, the Domain A server 108 no longer serves any content from the www.postage.com address and instead redirects the request 116 to a domain classifier 102 by way of an HTTP redirection response 118 specifying the domain address of the domain classifier 102. The client browser 104 reacts to the redirection response by re-POSTing a similar request to the domain classifier 102. In an alternative implementation, the address for the Domain A server 108 may have been merely transferred to the domain classifier 102 at some point in the past to avoid the intermediate redirection action.

Upon receiving the request 120 resulting from the redirection, the domain classifier 102 evaluates the request 120 and consults a domain classification database (not shown) that includes historical relevance data relating to previous attempts to access Domain A server 108. In this process, the domain classifier 102 attempts to discern the user's interest in trying to access the Domain A server 108. The domain classifier 102 may rely on various combinations of the domain address, target context factors, and source context factors. Target context factors represent context information collected about the target domain (i.e., the original target domain requested by the user's navigation). In contrast, the source context factors represent context information collected about the source of the request to the target domain, such as the user's browser configuration, the user's system configuration, the user's location, the user's Internet connection, etc. Both target context factors and source context factors may be evaluated with reference to the historical relevance information to identify a new content domain or to identify one or more keywords describing the user's perceived interest in attempting to access the target domain.

Based on analysis of the available information, the domain classifier 102 HTTP issues a redirection response 122 to redirect the client browser 104 to an appropriate Domain B server 110 believed to satisfy that interest. In reaction to the receipt of the redirection response 122, the client browser 104 now re-POST a similar request 124 to the Domain B server 110, which may, for example, including sponsored-links to Web content believed to be aligned with the user's interests. Domain B server 110 then returns Web content 124 that is expected to be of interest to the user. In another implementation, the domain classifier 102 generates one or more keywords intended to characterize the user's predicted interest and submits these to a computing system that can provide relevant Web content, such as a third-party ad server that can provide advertisements believed to be relevant to the user's interests or a third-party content management server that can provide documents (e.g., news, articles, papers, or other information) believed to be relevant to the user's interests.

In this manner, the owner of the Domain B server 110 is more likely to gain benefit by receiving a visit from a user believed to be interested in the Domain B content, and the owner of the domain classifier 102 may gain revenue by directing the potentially interested user to the Domain B server. It should be understood that, depending on the interest inferred by the domain classifier 102, the user may have been redirected to one or more other domains, such as the Domain C server 112 or the Domain D server 114.

For example, consider a user who selects a link that is embedded in an article ("www.postage.com/StampPriceIncrease.htm") about an increase in stamp prices. The original article author intended to provide the link as a citation to a related article. However, over time, the owner of the www.postage.com domain removed the StampPriceIncrease.htm article or stopped maintaining the www.postage.com website altogether. Instead, the www.postage.com owner redirects requests to the www.postage.com domain so that requesting users are redirected to a domain classifier. The domain classifier receives the request, and consults a domain classification database that includes historical relevance data pertaining to previous attempts to visit the www.postage.com domain. For example, the domain classifier may have previously received many requests via the www.postage.com/StampPriceIncrease.htm link and determined that the historical target context data pertaining to www.postage.com suggests previous user interest in buying stamps. Based on this analysis, the domain classifier infers that the current user may have interest in buying stamps and therefore redirects the user to a Web page that includes content about buying stamps and perhaps that offers stamps for sale.

In an alternative implementation, the owner of www.postage.com could have merely transferred the domain address to the domain classifier at some previous point in time, thereby avoiding the need to maintain the www.postage.com server. In this implementation, the user's initial request is sent directly to the domain classifier through typical domain name server functionality, and the initial redirection action is unnecessary. In yet another implementation, the domain classifier may generate one or more keywords pertaining to the perceived user interest and pass those keywords to a third-party ad server to provide new Web content to the user.

As discussed, the historical relevance data stored in the domain classification database can record a variety of relevance data types. The database is initially seeded with relevance data and redirection websites or keywords associated with such relevance data. For example, the database may be seeded with an initial profile for www.postage.com: (1) if a request is made to www.postage.com from a typed-in URL in a browser's address bar from an IP address in the United States, the user is directed to the United States Postal Service website; and (2) if the same request is made from an IP address in the United Kingdom, the user is directed to the Royal Mail website. This example uses both the domain name and a source context factor collected from the current visit (e.g., the IP address of the source system making the request) to identify a redirection website expected to be of interest to the user, although other examples may employ various combination of domain address, source context factors, and/or target context factors to classify the request for the target domain and discern user interest.

Both historical relevance data and context factors may be collected and analyzed to generate and contribute to aggregated relevance data informing the domain classifier 206 about the possible interests of users attempting to visit the target domain. Context factors from one visit may be fed back as historical relevance data for subsequent requests to the target domain. Such data may be obtained from many different sources, including without limitation:

Clickstream data—A clickstream is the recording of what a user clicks on while browsing a Web site to which he or she is redirected. Clickstream data may be collected on the path a user takes when navigating through the redirected website. Other clickstream data may track how many pages are served to the user from the redirected domain, how long it takes pages to load, how often the user hits the browser's back or stop button, how much data is transmitted before a user moves on, which pages the user lingers on, which items the user puts in or takes out of their shopping cart, which items the user purchases, which links the user selects to navigate away from the domain, etc. As the user clicks anywhere in the webpage, the action is logged to reveal usage patterns and therefore to discern interest. For example, if more people click who request www.postage.com linger or click through a Web page on stamp collecting than a Web page for the post office, the historical relevance data will likely emphasize stamp collecting in association with the domain address www.postage.com.

User session data—Session data may include browser type and version, operating system type and version, time of day, day of week, day of month, day of year, year, screen resolution, screen color, user's ISP domain name gTLD or ccTLD, Java enabled, Flash enabled, preferred language, etc.

IP address—related information of the requesting system—Based on the user/host machine's IP address, the domain classifier may discern many characteristics of the source, including geographic location (continent, country, US region, time zone, state, city, postal code, longitude/latitude, phone prefix, Nielsen Designated Market Area, US Census Bureau Metropolitan Statistical Area, industry/company type, company name, company size, connection type, connection speed, ISP, Claritas Prizm Cluster, etc.

Content—A scan of the previously viewed Web page may be used to generate a variety of data types that can be used to influence the domain classification. The scan can yield information that includes but is not limited to meta keywords; meta descriptions; page title; alt tags; other meta tags; body text; links; file names; anchor text; referring URL; relative proximity and density of information, keywords and concepts therein; anchor keywords; etc.

Other structured sources of information may be used to influence the domain classification, such as by submitting a domain address for analysis, retrieving context factors for a source or target domain, and/or analyzing the components (e.g., text, address fields, etc.) contained in a source or target domain address:

- Alexa Web Information Service—primary and subcategory, related categories, related sites by category, metadata, list of sites linking in, historical traffic rank, related links, rank, rank by country, rank by city, reach, pageviews, owner contact information, presence of adult content, media load time, relative load speed, content language, related keywords, other domains owned, title, description, creation date, presence of pop ups, thumbnail, links pointing out
- Open Directory—current and historic categories and related categories as classified by the submitting Web site owner or Open Directory category editor
- NAICS (North America Industry Classification System)—maps industries by keyword
- Yahoo—product ratings, retail category and department, user reviews, number of questions that match a query, category of questions for a query, longitude/latitude, traffic information, search listing title, search listing description, cached page analysis, historical news, number of links in, directory category, related categories, cached pages, related terms and phrases, suggested spelling/misspelling variations, related analysis of the content, find related terms
- Blogpulse—related discussions, topic popularity, recency, trends
- Simulicious—related web sites by keyword tag
- MSN—category, sensitive content, keyword extraction, demographics by URL or search term, commercial intention, geographic location, determine acronyms, related terms, determine misspellings, seasonality, search listing title, search listing description, cached page analysis, number of links in
- Ask.com—search listing title, search listing description, cached page analysis, number of links in
- SEMPunch—average click through rate for a term
- Technorati—related keyword phrase tags
- ZingoSoft—find related tags for a page
- Del.icio.us—tags assigned, number of times bookmarked/popularity, analysis of tag descriptions, latitude/longitude, other triple tags, common tags for a URL
- Compete—popularity and traffic statistics
- Quantcast—keywords used to find this site, related sites, demographics of site visitors
- Furl.net—tags assigned, number of times bookmarked
- Pricegrabber—ecommerce shopping data
- eBay—listings number, related listings, average price, descriptions, categories, buyer age, gender, geographic location
- Amazon.com—product information, historical pricing
- SenderBase—historical and current spam score
- URL Trends—Google PageRank, Alexa Rank, links out, links in Google, links in Yahoo, links in MSN, links in Alexa, links in AltaVista, links in AllTheWeb, links in Teoma, links in IceRocket, links in Del.icio.us, links in FURL, Open Directory category, adult related content, title, description, online since, last updated, related search term keywords; all of this information currently and by historical date
- Keyword Discovery—total searches and monthly searches for a given keyword phrase or term, related keyword phrases or terms, common spelling variations, degree of spelling variation difference, shopping term popularity, translation
- Digg.com—popularity score
- Trynt—extract related terms from a page
- Find Forward—historical popularity
- Archive.org—date page was created, scan of the historical page content (including, but not limited to meta keywords, meta descriptions, page title, alt tags, other meta tags, body text, links, file names, anchor text, referring URL and relative proximity and density of information, keywords and concepts therein; anchor keywords)
- Google/Froogle—search listing title, search listing description, PageRank, number of news stories, notebooks containing a term or phrase or concept, related keyword terms, related links, related news, related videos, cached page, historical news, number of links in, historical news popularity, competitive or related advertisers, term popularity by country source, historical term popularity, historical news, retail fit, retail items for sale and descriptions, number of pages indexed
- ZoomInfo—company or person description and information
- Relevad—find related keyword terms and phrases and categorization, analyze text for common keyword terms, phrases or concepts
- SpyFoo/VelocityScape—related terms used by competition, related terms, categories
- TagThe.net—related keyword terms/tags of the page, title, page size, content type, geographic location of site, site language, date last modified
- Tagtooga—title, description, popularity score, thumbnail, popularity score, inclusion of Flash, 10 important words on the page, inclusion ads, use of popunders, favicon, related categories, related tags
- Topicalizer—top keywords and phrases and frequency/density for a given page, related keyword terms to a page or text block/phrase, category of a page, words per sentence, words per paragraph, lexical density, characters per word, syllables per word, longest word, shortest word, paragraph count, sentence count, sentences per paragraph, longest sentence, shortest sentence, Thumbshots—thumbnail image of web sites, whether current or in their previous incarnations Abbreviations/Acronyms/Synonyms—determine possible meaning of abbreviations/acronyms/synonyms (e.g., to identify additional keywords that may be associated with a specified target domain address)

Misspellings and Language Variations—(e.g., to identify additional keywords that may be associated with a specified target domain address)

Figure 2:
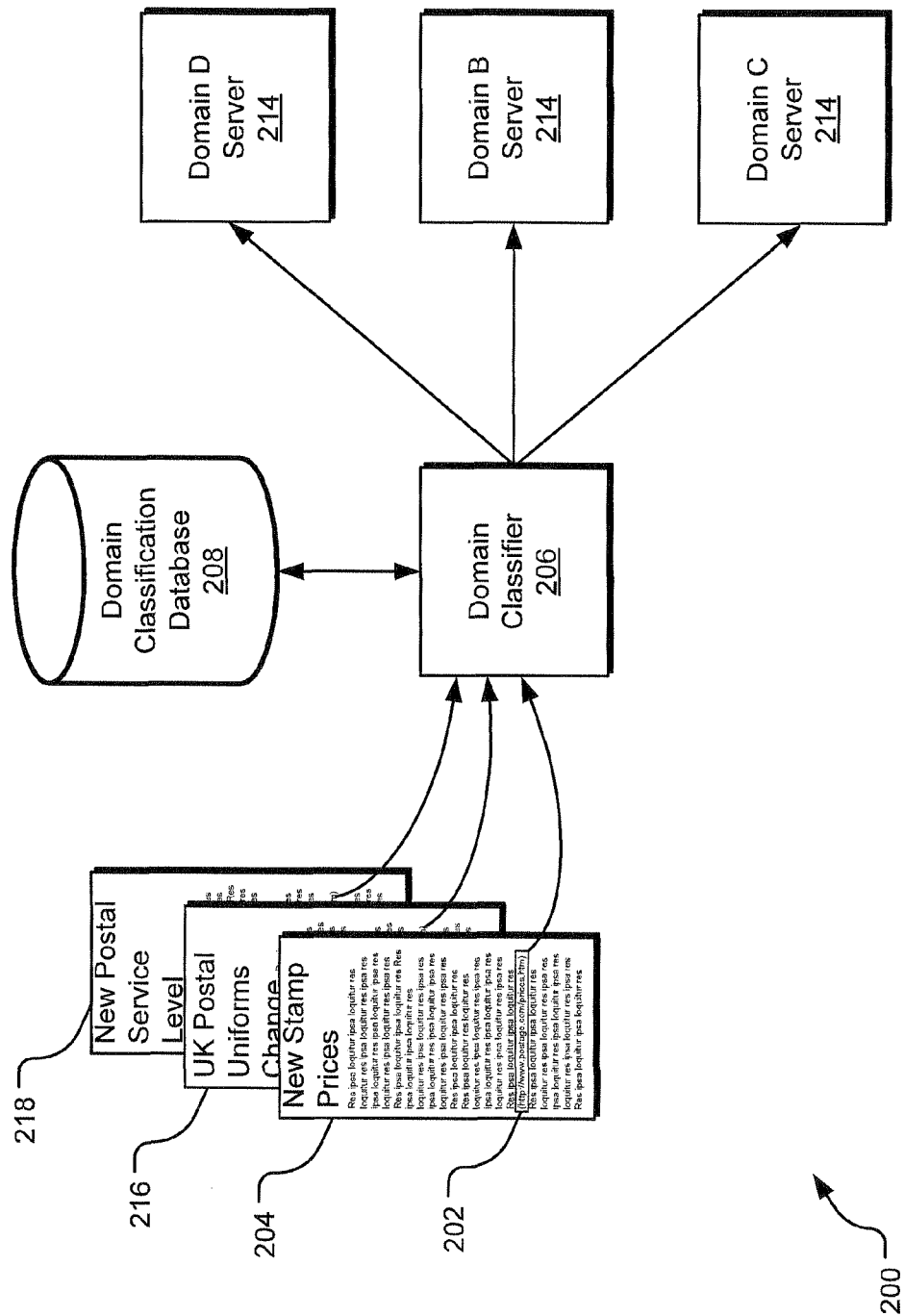
FIG. 2 illustrates an exemplary domain classifier configuration providing access to Web content based on requests originating from links on Web pages.

FIG. 2 illustrates an exemplary domain classifier configuration 200 providing access to Web content based on requests originating from links on Web pages. In one implementation, a user selects a link 202 from a Web page 204. A resulting request, which includes the domain address of the target website associated with the link, is transmitted to a domain classifier 206 (e.g., assume the domain address has been transferred from the original target website to the domain classifier's server). The domain classifier 206 evaluates the target domain address in the request (e.g., www.postage.com) against historical relevance data in a domain classification database 208. The domain classifier 206 may also collect additional source context data and/or target context data pertaining to the current visit from one or more of the other source context information sources listed above. The context data about the current visit may be used as "search context factors". Both the domain address and the context factors can be evaluated using the historical relevance data in the domain classification database 208 to allow the domain classifier 206 to identify a new website (e.g., one of Domain A server 210, Domain B server 212, and Domain C server 214) to which the browser should be redirected or to identify one or more keywords characterizing the user's perceived interest. After the redirection to the new website, the context factors of the current visit may be integrated into the historical relevance data to improve the accuracy of future redirections.

For example, the link 202 includes a domain address—"www.postage.com". If the target website ("www.postage.com/prices.htm") is not available at the domain address (and so the browser is redirected to the domain classifier) or if the domain address has been transferred to the computing system executing the domain classifier 206, then the domain classifier 206 may consult the domain classification database 208 to infer the user's interest based on the domain name. In one scenario, the domain classifier 206 may redirect the browser to a website at Domain A server 210 that relates to stamp collection, because the domain classification data classifies the target domain address as being aligned with collecting stamps (e.g., based on the historical relevance data and the domain address alone, the domain classifier classifies www.postage.com as being associated with stamp collecting and redirects the browser to such as website). In a typical arrangement, the owner of the Domain A server 210 would compensate the domain classifier for the referral. Compensation may vary based on the user's activity at Doman A subsequent to the redirection.

However, the domain classifier 206 may further collect source and/or target context factors about the current visit from the source web page 204, which can further inform the domain classification. For example, by scanning and indexing the content of the source web page 204, the domain classifier 206 may observe a high frequency of words such as "post" and "office" and a low frequency of "collect" and "appreciate", which can server as source context factors to be used in the domain classification. The domain classifier 206 may then identify a more appropriate domain and therefore redirect the browser to a different webpage at Domain B Server 212, which has content pertaining to U.S. Postal Service stamp prices.

In yet another scenario, the domain classifier 206 may further collect source context factors about the current visit from the source IP address available in the client browser's request and thereby identify a geographical region in which the browser is operating. For example, in addition to the stamp price association made in the previous paragraph, the domain classifier 206 may detect that the browser is located in the United Kingdom, and therefore the domain classifier 206 may then identify and redirect the browser to a different webpage at Domain C Server 213, which has content pertaining to Royal Mail stamp prices.

It should be understood that links from other web pages, such as pages 216 and 218, are likely to spawn a different classification, particularly as more source and/or target context factors are added to the domain classification database. Therefore, requests through links from pages 216 and 218 will likely result in redirection to a different web page, because the combination of the domain address and context factors suggests different user interests.

Figure 3:
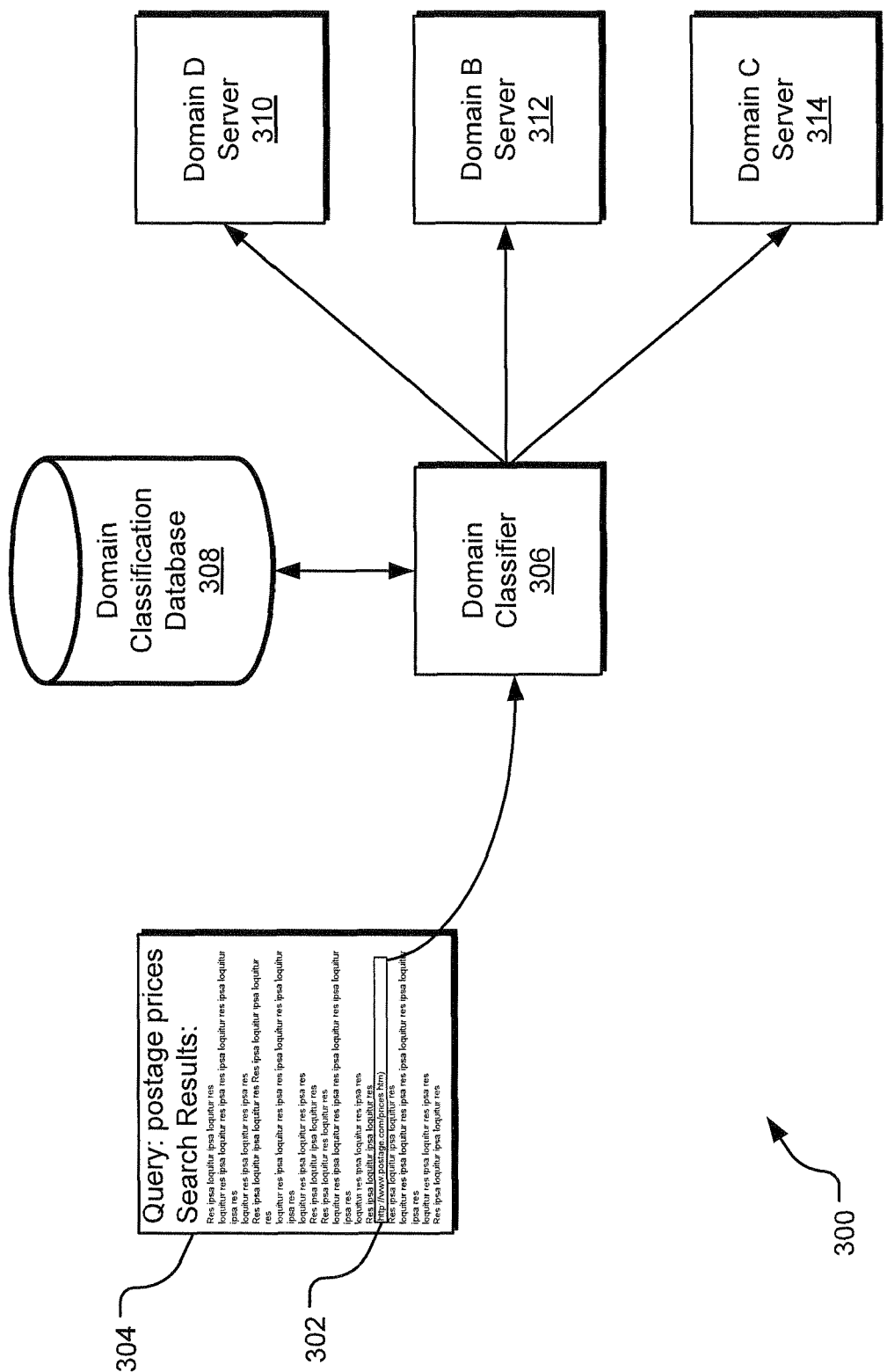
FIG. 3 illustrates an exemplary domain classifier configuration providing access to Web content based on a request originating from a link on a search results page.

FIG. 3 illustrates an exemplary domain classifier configuration 300 providing access to Web content based on a request originating from a link on a search results page. In one implementation, a user selects a link 302 from a search results page 304. A resulting request, which includes the domain address of the target website, is transmitted to a domain classifier 306 (e.g., assume the domain address has been transferred from the original target website to the domain classifier's server). The domain classifier 306 evaluates the domain address in the request (e.g., www.postage.com) against historical relevance data in a domain classification database 308. The domain classifier 306 may also collect context factors pertaining to the current visit from one or more of the other context information sources listed above. Both the domain address and the context factors can be evaluated using the historical relevance data in the domain classification database 308 to allow the domain classifier 306 to identify a new website (e.g., one of Domain A server 310, Domain B server 312, and Domain C server 314) to which the browser should be redirected (or to identify one or more keywords characterizing the user's perceived interest). After the redirection to the new website, the context factors of the current visit may be integrated into the historical relevance data to improve the accuracy of future redirections.

In the illustrated example, the search link 302 includes, as before, a domain address—"www.postage.com". If the target website ("www.postage.com/prices.htm") is not available at the domain address (and so the browser is redirected to the domain classifier) or if the domain address has been transferred to the domain classifier 306, then the domain classifier 306 may collect the search keywords (e.g., as source context factors) from the search that resulted in the search results page and consult the domain classification database 308 to infer the user's interest from the domain address and the search keywords. In one scenario, the domain classifier 306 may redirect the browser to a website at Domain A server 310 that relates to stamp collection, because the historical relevance data classifies the target domain address and the search key words as being aligned with collecting stamps.

In another scenario, the domain classification database 308 may include historical relevance data collected prior to the request. The domain classifier 306 can access third-party a web site, such as www.relevad.com, and submit keywords from the target domain address. In the case of www.relevad.

com, the domain classifier 306 can obtain a weighted list of keywords that are related to the one or more keywords in the requested domain address, one or more of which can be used to classify the requested domain address and generate a redirection domain address. It should be understood that such a look-up using a third-party information source may occur a priori to the request or in real-time with the request, depending on the speed of the look-up process. As such, using such an information source, the domain classifier 306 can redirect the browser to a different webpage at Domain B Server 312, which covers U.S. Postal Service stamp prices.

In yet another scenario, the domain classifier 306 may further collect source context information from the user's session data available from cookies on the user's computer. For example, the user may have previously visited the target domain, only to now find it no longer available. Nevertheless, the domain classifier 306 may now access session data in a cookie associated with the target domain. The session data may provide information useful to the domain classifier in determining the interest of the user. For example, in addition to the stamp price association made in the previous paragraph, the domain classifier 306 may determine from the session data that the user's previous visits to www.postage.com domain resulted in online orders of postage products. Accordingly, the domain classifier 306 can then redirect the browser to a different webpage at Domain C Server 313, which handles postage supply orders online.

Figure 4:
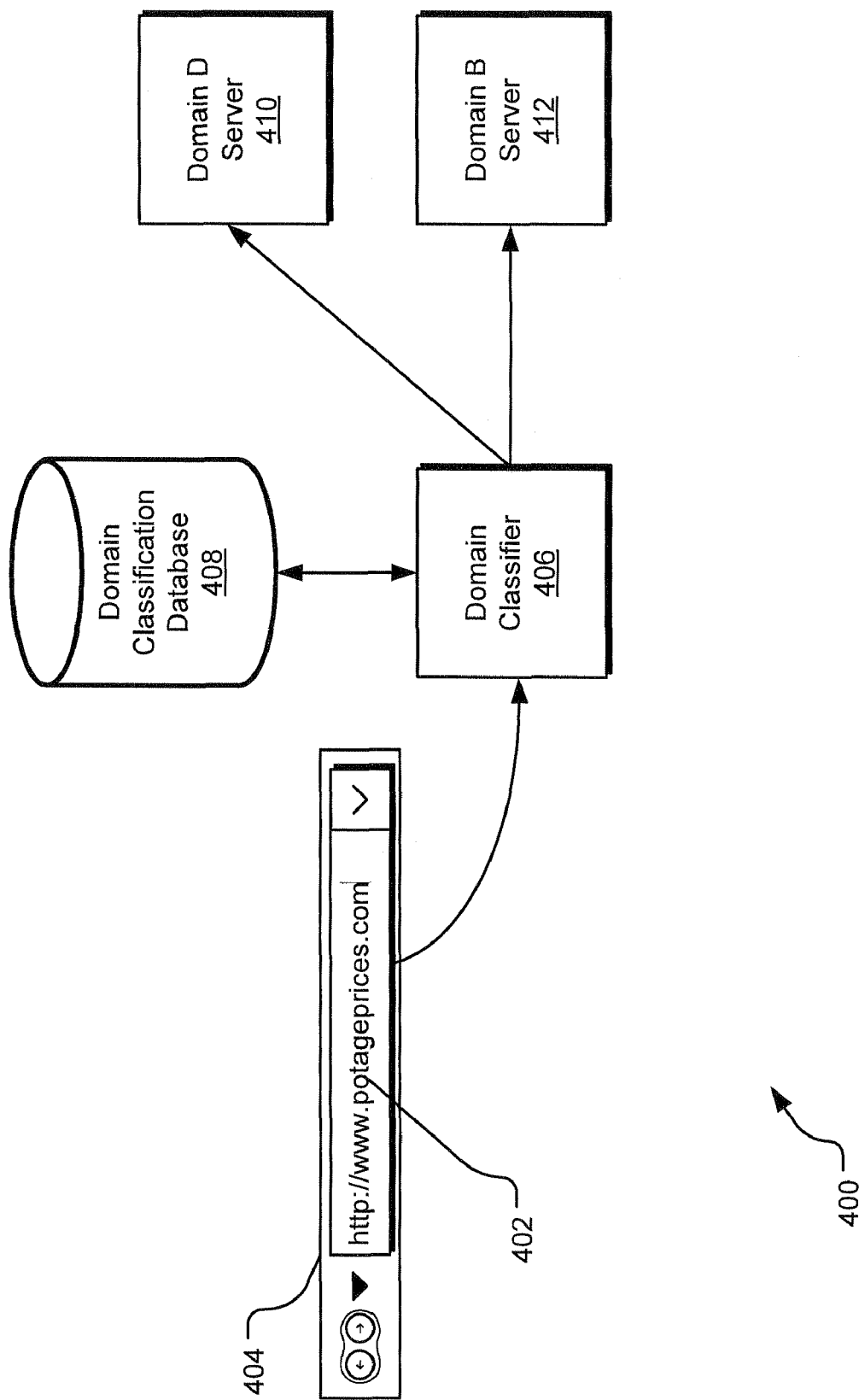
FIG. 4 illustrates an exemplary domain classifier configuration providing access to Web content based on request a originating from an address typed by a user into an address field.

FIG. 4 illustrates an exemplary domain classifier configuration 400 providing access to Web content based on request a originating from an address typed by a user into an address field. In one implementation, a user types a URL into an address field 402 of a browser's address bar 404. A resulting request, which includes the domain address of the target website, is transmitted to a domain classifier 406 (e.g., assume the domain address has been transferred from the original target website to the domain classifier's server). The domain classifier 406 evaluates the domain address in the request (e.g., www.postage.com) against historical relevance data in a domain classification database 408. The domain address can be evaluated using the historical reference data to allow the domain classifier 406 to identify a new website (e.g., one of Domain A server 410, Domain B server 412, and Domain C server 414) to which the browser should be redirected.

For example, the URL 402 includes a domain address— "www.postage.com". If the target website ("www.postage.com/prices.htm") is not available at the domain address (and so the browser is redirected to the domain classifier) or if the domain address has been transferred to the domain classifier 406, then the domain classifier 406 may consult the historical relevance data to infer the user's intent. In one scenario, the domain classifier 406 may redirect the browser to a website at Domain A server 410 that relates to stamp collection, because the historical relevance data classifies the target domain address as being aligned with collecting stamps.

However, the domain classifier 406 may further collect target and/or source context factors for the current visit to further inform the domain classification. For example, the source domain address or the target domain address may be (or may have previously been) submitted to a misspellings database to generate variations of the domain name that can be used in the classification. For example, the user may have inadvertently entered www.potage.com. If the domain classifier 406 is configured to receive requests for www.potage.com, then the domain classifier 406 can have already classified a request to www.potage.com as being related to a "postage" keyword. Accordingly, the historical relevance data pertaining to www.potage.com can be associated with postage-related interest keywords. The domain classifier 406 may then redirect the browser to a webpage at Domain B Server 412, which is related to postage services (or pass the one or more interest keywords on to an ad server, a content management server, etc.).

It should be understood that the misspellings database may also be used in real time, such that the domain classifier 406 collects misspelling variations of "potage" and recognizes "postage" as an interest keyword that it can work with. In one implementation, all variations can be evaluated against the historical relevance data, and the best-fit will be found based on all available information.

Figure 5:
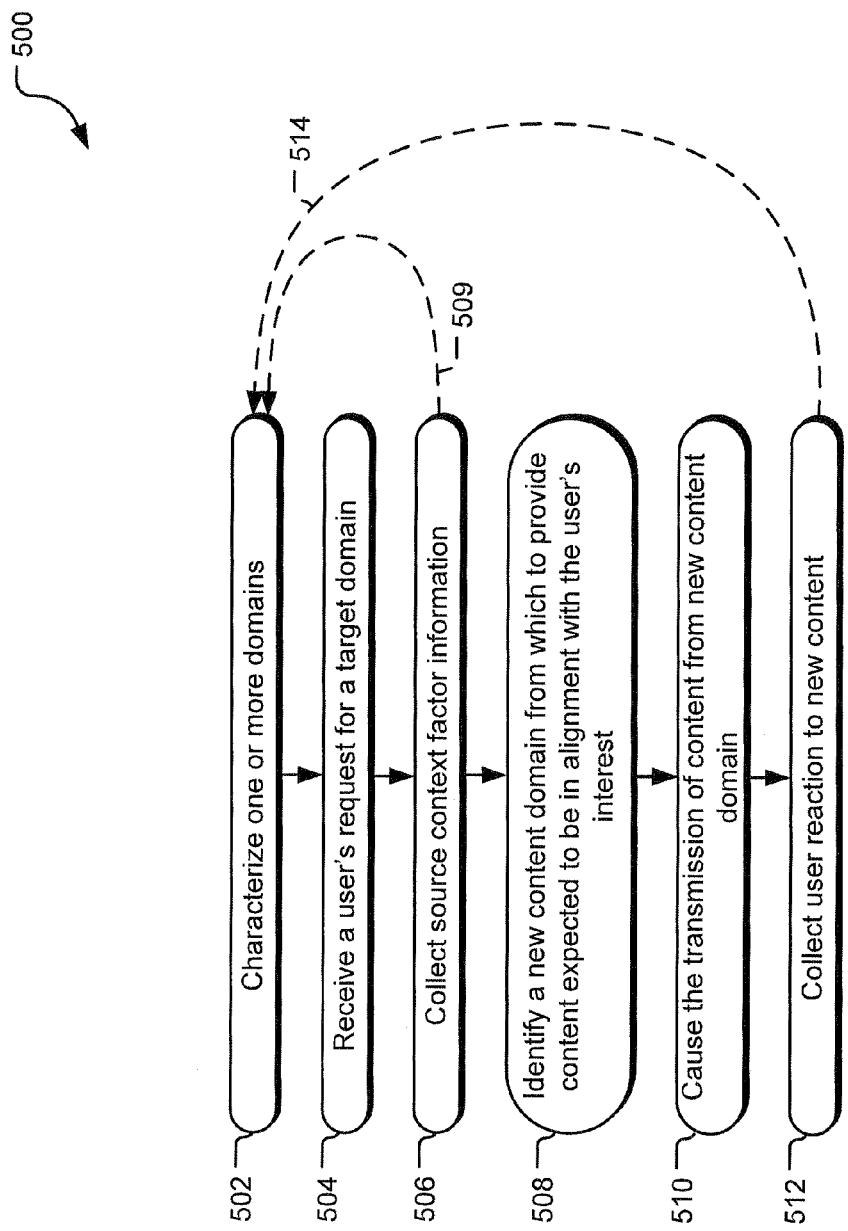
FIG. 5 illustrates exemplary operations for relevancy-based domain classification.

FIG. 5 illustrates exemplary operations 500 for relevancy-based domain classification. A characterization operation 502 characterizes a domain that has been designated for redirection or for other relevant provision of web content. Initially, such the characterization operation 502 associates the domain address of the target domain with one or more new content domains (e.g., the domains to which the domain classifier may redirect the user request). It should be understand that in an alternative implementation, rather than redirection, the domain classifier will cause relevant content to be served from an appropriate domain (e.g., from a third-party ad server or other content server).

If there is just one new content domain available for this domain address, then there not much need for domain classification. However, in the presence of two or more new content domains associated with the original target domain, each new content domain is associated with select historical relevance information, which is used by the domain classifier to identify the more relevant of the two new content domains from which to provide the new content.

For example, a domain classifier is configured to determine whether to send request to a certain target domain (www.postage.com) to one of two new content domains (www.USPS.gov or www.RoyalMail.com). As such, the domain classification database may be populated with relevance records indicating that:

(1) if the target domain is www.postage.com and if a source context factor derived from the IP address of the request identifies the United States as the location of the client system issuing the request, then the request should be redirected to www.USPS.gov;
(2) if the target domain is www.postage.com and if a source context factor derived from the IP address of the request identifies the United Kingdom as the location of the client system issuing the request, then the request should be redirected to www.RoyalMail.com; and
(3) if the target domain is www.postage.com and if a source context factor derived from the IP address of the request identifies some other geographical region as the location of the client system issuing the request, then the request should be redirected to www.USPS.gov.

As an alternative to the conditional, Boolean tests exemplified above, a statistical classification algorithm may be used to classify a specified domain address and collected source context factors and pertaining to a particular new content domain. Generally, statistical classification places individual items (e.g., target domain address) into classifications or groups (e.g., a class associated with a select new content domain) based on quantitative information (e.g., source context factors) on one or more characteristics (e.g., geographical region, textual features of the previously visited webpage) inherent in the items. The placement is based on a training set of previously classified items (e.g., historical relevance data mapping specific target domain addresses and combinations of historical search context factors to specific new content domains).

Formally, the statistical classification problem for domain classification can be stated as follows: given historical relevance data $(x_1, y_1), \ldots, (x_n, y_n)$, produce a domain classifier $h: x \to y$ that maps an object $x \in X$ (e.g., a combination of a domain address and potentially source context search factors) to its classification label $y \in Y$ (e.g., a new content domain address). There are many types of statistical classification that can be applied to the problem of domain classification, although they are generally solving one of three related mathematical problems.

The first problem is to find a map of a feature space (which is typically a multi-dimensional vector space) to a set of labels. This is equivalent to partitioning the feature space into regions, then assigning a label to each region. Such algorithms (e.g., the nearest neighbor algorithm) typically do not yield confidence or class probabilities, unless post-processing is applied. Another set of algorithms to solve this problem first apply unsupervised clustering to the feature space, then attempt to label each of the clusters or regions.

The second problem is to consider classification as an estimation problem, where the goal is to estimate a function of the form $P(\text{class}|\vec{x}) = f(|\vec{x}; \vec{\theta})$, where the feature vector input is $\vec{x}$, and the function $f$ is typically parameterized by some parameters $\vec{\theta}$. In the Bayesian approach to this problem, instead of choosing a single parameter vector $\vec{\theta}$, the result is integrated over all possible $\theta$s, with the $\theta$s weighted by how likely each $\theta$ is, given the training data D:

$$P(\text{class}|\vec{x}) = \int f(\vec{x}, \vec{\theta}) P(\vec{\theta}|D) d\vec{\theta}$$

The third problem is related to the second, but the problem is to estimate the class-conditional probabilities $P(\vec{x}|\text{class})$ and then use Bayes' Rule to produce the class probability as in the second problem. Examples of classification algorithms include: linear classifiers, such as Fisher's linear discriminant, logistic regression, naive Bayes classifier, and perceptron; quadratic classifiers, k-nearest neighbor, boosting, decision trees, neural networks, Bayesian networks, support vector machines, and hidden Markov models.

A receiving operation 504 receives a user's request for content from a target domain, specified by a domain address included with the request. A collection operation 506 collects source context factor information associated with the source of the request, although in some scenarios, such source context factor information is not required to perform an appropriate domain classification. When source context factor information is collected (e.g., such as from one or more of the information sources previously discussed), a classification operation 508 evaluates the domain address and the source context factors against the historical relevance data to identify a new content domain from which to serve content to the user. The collected source context factor information may also be fed back into the historical relevance data for use with subsequent requests for the target domain (see dashed arrow 509). In this manner, the historical relevance data can be updated on the basis of other subsequent redirections and the apparent user reaction to the redirection (see collection operation 512).

A transmission operation 510 causes the transmission of content from the identified new content domain. In one implementation, the domain classifier causes said transmission by redirecting the user's browser to the new content domain, whereby the user's redirected request results in a response from the new content domain. In another implementation, the domain classifier performs similar processing functions as it would for a redirection implementation. However, instead of selecting a redirected URL location to send the user, the domain classifier specifies one or more appropriate interest keywords, which can be submitted to a Web content provider (e.g., an ad server or content management server) to provide the user with content (e.g., a banner ad from a new content domain) associated with the interest keywords. In yet another implementation, the domain classifier selects a Web content object (e.g., a relevant news article from a new content domain) identified in the domain classification as pertaining to a perceived interest. For example, the Web content object may include an associated redirection URL that is not spawned automatically on deliver to the user's browser. Content from the new content domain is received by the user's browser as a result of the transmission operation 510.

A collection operation 512 collects clickstream data from the user's post-visit behavior at the new content domain. In one implementation, the collection operation 512 evaluates the clickstream data to determine whether the identified new content domain was truly of interest to the user (e.g., user lingers on site, user navigates some level into the site, etc.). This determination can be used to update the historical relevance data (see dashed arrow 514).

Figure 6:
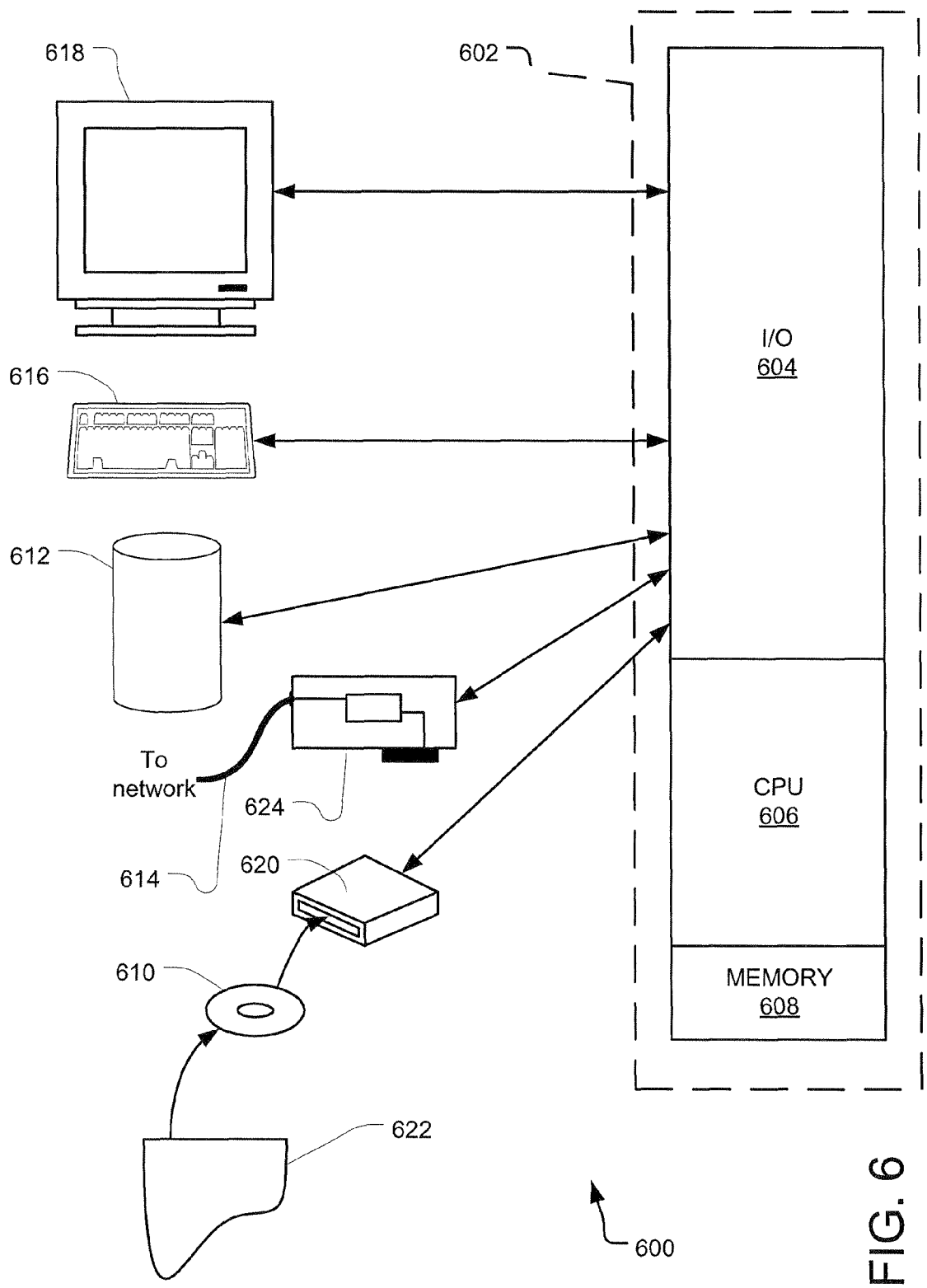
FIG. 6 illustrates an exemplary system useful in implementations of the described technology.

FIG. 6 illustrates an exemplary system useful in implementations of the described technology. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 to a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 604, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In an exemplary implementation, the domain classifier, collection modules, identification modules, characterization modules, and other modules may be incorporated as part of the operating system, application programs, or other program modules. Historical relevance data, domain addresses, source context factors, web content, and other data may be stored as program data.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method comprising:
    receiving a request from a source to access content of a target Web domain, the request being addressed to a domain address of the target Web domain;
    retrieving historical relevance data associated with at least one previous request from another source to the target Web domain from a database;
    identifying a new content Web domain that is determined to be relevant to the request based on a combination of the domain address of the target Web domain and the historical relevance data, the historical relevance data including one or more context factors collected from the at least one previous request to the target Web domain; and
    redirecting the source to access advertising content of the identified new content Web domain, responsive to the request.

2. The method of claim 1 wherein redirecting the source to access advertising content of the identified new content Web domain comprises:
    accessing the advertising content from the new content domain;
    serving the advertising content to the source.

3. The method of claim 1 wherein redirecting the source to access advertising content of the identified new content Web domain comprises:
    accessing a Web content object from the new content Web domain;
    serving the Web content object to the source.

4. The method of claim 3 wherein the Web content object includes an advertisement determined to the relevant to the request from the source.

5. The method of claim 3 wherein the Web content object includes a document determined to the relevant to the request from the source.

6. The method of claim 1 wherein the domain address is a URI.

7. The method of claim 1 wherein the domain address is an IP address.

8. The method of claim 1 wherein the historical relevance data conditionally maps the domain address of the target Web domain to a domain address of the new content Web domain.

9. The method of claim 1 wherein the context factors include source context data collected from a source of at least one previous request to the target Web domain.

10. The method of claim 1 wherein the context factors include target context data collected about the target Web domain from at least one previous request to the target Web domain.

11. The method of claim 1 further comprising:
    collecting one or more source context factors pertaining to the source of the request, wherein the identifying operation comprises identifying a new content Web domain that is determined to be relevant to the request based on a combination of the domain address of the target Web domain, the collected source context factors, and historical relevance data associated with the target Web domain.

12. The method of claim 1 further comprising:
    collecting one or more target context factors pertaining to the target Web domain, wherein the identifying operation comprises identifying a new content Web domain that is determined to be relevant to the request based on a combination of the domain address of the target Web domain, the collected target context factors, and historical relevance data associated with the target Web domain.

13. The method of claim 1 further comprising:
storing the new content Web domain on one or more computer-readable storage media.

14. The method of claim 1 wherein the database stores a plurality of domains and the new content Web domain is identified from the plurality of domains.

15. One or more tangible computer readable storage media storing computer-executable instructions for performing a computer process, the computer process comprising:
receiving a request from a source to access content of a target Web domain, the request being addressed to a domain address of the target Web domain;
retrieving historical relevance data associated with at least one previous request from another source to the target Web domain from a database;
identifying a new content Web domain that is determined to be relevant to the request based on a combination of the domain address of the target Web domain and the historical relevance data, the historical relevance data including one or more context factors collected from the at least one previous request to the target Web domain; and
redirecting the source to access advertising content of the identified new content Web domain, responsive to the request.

16. The one or more tangible computer readable storage media of claim 15 wherein the operation of redirecting the source to access content of the identified new content Web domain comprises:
accessing the advertising content from the new content Web domain;
serving the advertising content to the source.

17. The one or more tangible computer readable storage media of claim 15 wherein the operation of redirecting the source to access content of the identified new content Web domain comprises:
accessing a Web content object from the new content Web domain;
serving the Web content object to the source.

18. The one or more tangible computer readable storage media of claim 17 wherein the Web content object includes an advertisement determined to the relevant to the request from the source.

19. The one or more tangible computer readable storage media of claim 17 wherein the Web content object includes a document determined to the relevant to the request from the source.

20. The one or more tangible computer readable storage media of claim 15 wherein the domain address is a URI.

21. The one or more tangible computer readable storage media of claim 15 wherein the domain address is an IP address.

22. The one or more tangible computer readable storage media of claim 15 wherein the historical relevance data conditionally maps the domain address of the target Web domain to a domain address of the new content Web domain.

23. The one or more tangible computer readable storage media of claim 15 wherein the context factors include source context data collected from a source of at least one previous request to the target Web domain.

24. The one or more tangible computer readable storage media of claim 15 wherein the context factors include target context data collected about the target Web domain from at least one previous request to the target Web domain.

25. The one or more tangible computer readable storage media of claim 15 wherein the computer process further comprises:
collecting one or more source context factors pertaining to the source of the request, wherein the identifying operation comprises identifying a new content Web domain that is determined to be relevant to the request based on a combination of the domain address of the target Web domain, the collected source context factors, and historical relevance data associated with the target Web domain.

26. The one or more tangible computer readable storage media of claim 15 wherein the computer process further comprises:
collecting one or more target context factors pertaining to the target Web domain, wherein the identifying operation comprises identifying a new content Web domain that is determined to be relevant to the request based on a combination of the domain address of the target Web domain, the collected target context factors, and historical relevance data associated with the target Web domain.

27. The tangible computer readable storage media of claim 15, wherein the computer process further comprises:
storing the new content Web domain on the computer-readable storage media.

28. The computer readable storage media of claim 15 wherein the database stores a plurality of domains and the new content Web domain is identified from the plurality of domains.

29. A method comprising:
receiving a request from a source to access content of a target Web domain, the request being addressed to a domain address of the target Web domain;
retrieving historical relevance data associated with at least one previous request from another source to the target Web domain from a database;
identifying at least one interest keyword that is determined to be relevant to the request based on a combination of the domain address of the target Web domain and the historical relevance data, the historical relevance data including one or more context factors collected from the at least one previous request to the target Web domain;
transmitting the at least one interest keyword to a server that serves Web content associated with the interest keyword to the source, responsive to the request; and
redirecting the source to access advertising content defined by the at least one interest keyword, responsive to the request.

30. The method of claim 29 wherein the transmitting operation comprises:
transmitting the at least one interest keyword to an ad server that serves the source with an advertisement that is determined to be relevant to the at least one interest keyword.

31. The method of claim 29 wherein the transmitting operation comprises:
transmitting the at least one interest keyword to a document server that serves the source with document that is determined to be relevant to the at least one interest keyword.

32. The method of claim 29 wherein the historical relevance data conditionally maps the domain address of the target Web domain to the at least one interest keyword.

33. The method of claim 29 wherein the context factors include source context data collected from a source of at least one previous request to the target Web domain.

34. The method of claim 29 wherein the context factors include target context data collected about the target domain from at least one previous request to the target Web domain.

35. The method of claim 29 further comprising:
collecting one or more source context factors pertaining to the target Web domain, wherein the identifying operation comprises identifying at least one interest keyword that is determined to be relevant to the request based on a combination of the domain address of the target Web domain, the collected source context factors, and historical relevance data associated with the target Web domain.

36. The method of claim 29 further comprising:
collecting one or more target context factors pertaining to the target Web domain, wherein the identifying operation comprises identifying at least one interest keyword that is determined to be relevant to the request based on a combination of the domain address of the target Web domain, the collected target context factors, and historical relevance data associated with the target Web domain.

37. The method of claim 29 further comprising:
storing the at least one interest keyword on one or more computer-readable storage media.

38. The method of claim 29 wherein the database stores a plurality of interest keywords and the identified interest keyword is identified from the plurality of interest keywords.

39. One or more tangible computer readable storage media storing computer-executable instructions for performing a computer process, the computer process comprising:
receiving a request from a source to access content of a target Web domain, the request being addressed to a domain address of the target Web domain;
retrieving historical relevance data associated with at least one previous request from another source to the target Web domain from a database;
identifying at least one interest keyword that is determined to be relevant to the request based on a combination of the domain address of the target Web domain and the historical relevance data, the historical relevance data including one or more context factors collected from the at least one previous request to the target Web domain;
transmitting the at least one interest keyword to a server that serves Web content associated with the interest keyword to the source, responsive to the request; and
redirecting the source to access advertising content defined by the at least one interest keyword, responsive to the request.

40. The one or more tangible computer readable storage media of claim 39 wherein the transmitting operation comprises:
transmitting the at least one interest keyword to an ad server that serves the source with an advertisement that is determined to be relevant to the at least one interest keyword.

41. The one or more tangible computer readable storage media of claim 39 wherein the transmitting operation comprises:
transmitting the at least one interest keyword to a document server that serves the source with document that is determined to be relevant to the at least one interest keyword.

42. The one or more tangible computer readable storage media of claim 39 wherein the historical relevance data conditionally maps the domain address of the target Web domain to the at least one interest keyword.

43. The one or more tangible computer readable storage media of claim 39 wherein the context factors include source context data collected from a source of at least one previous request to the target Web domain.

44. The one or more tangible computer readable storage media of claim 39 wherein the context factors include target context data collected about the target Web domain from at least one previous request to the target Web domain.

45. The one or more tangible computer readable storage media of claim 39 further comprising:
collecting one or more source context factors pertaining to the target Web domain, wherein the identifying operation comprises identifying at least one interest keyword that is determined to be relevant to the request based on a combination of the domain address of the target Web domain, the collected source context factors, and historical relevance data associated with the target Web domain.

46. The one or more tangible computer readable storage media of claim 39 further comprising:
collecting one or more target context factors pertaining to the target Web domain, wherein the identifying operation comprises identifying at least one interest keyword that is determined to be relevant to the request based on a combination of the domain address of the target Web domain, the collected target context factors, and historical relevance data associated with the target Web domain.

47. The tangible computer readable storage media of claim 39 wherein the computer process further comprises:
storing the at least one interest keyword on the computer-readable storage media.

48. The computer readable storage media of claim 39 wherein the database stores a plurality of interest keywords and the identified interest keyword is identified from the plurality of interest keywords.

* * * * *